US011112790B2

(12) United States Patent
Gross et al.

(10) Patent No.: US 11,112,790 B2
(45) Date of Patent: Sep. 7, 2021

(54) MICRO-AUTHORIZATION OF REMOTE ASSISTANCE FOR AN AUTONOMOUS VEHICLE

(71) Applicant: GM GLOBAL TECHNOLOGY OPERATIONS LLC, Detroit, MI (US)

(72) Inventors: Drew Gross, San Francisco, CA (US); Brian Pierce, Santa Clara, CA (US); Gillian Langor, Oakland, CA (US); Haven Lau, Markham (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 223 days.

(21) Appl. No.: 16/228,877

(22) Filed: Dec. 21, 2018

(65) Prior Publication Data

US 2020/0201319 A1    Jun. 25, 2020

(51) Int. Cl.
| | |
|---|---|
| *G05D 1/00* | (2006.01) |
| *G05D 1/02* | (2020.01) |
| *H04W 4/44* | (2018.01) |
| *B60W 50/00* | (2006.01) |

(52) U.S. Cl.
CPC ........... *G05D 1/0038* (2013.01); *B60W 50/00* (2013.01); *G05D 1/0212* (2013.01); *G05D 1/0231* (2013.01); *G05D 1/0276* (2013.01); *H04W 4/44* (2018.02); *B60W 2050/0077* (2013.01)

(58) Field of Classification Search
CPC .. G05D 1/0038; G05D 1/0231; G05D 1/0276; G05D 1/0212; B60W 50/00; B60W 2050/0077; H04W 4/44
See application file for complete search history.

(56) References Cited

U.S. PATENT DOCUMENTS

| | | | |
|---|---|---|---|
| 8,718,861 | B1 | 5/2014 | Montemerlo et al. |
| 9,690,290 | B2 | 6/2017 | Prokhorov |
| 10,078,964 | B2 | 9/2018 | Li et al. |
| 2017/0045885 | A1 | 2/2017 | Okumura et al. |
| 2017/0277181 | A1 | 9/2017 | Fairfield et al. |
| 2019/0152472 | A1* | 5/2019 | Aksyutina ............ G05D 1/0022 |

* cited by examiner

*Primary Examiner* — Yuen Wong
(74) *Attorney, Agent, or Firm* — Medley, Behrens & Lewis, LLC

(57) ABSTRACT

Micro-authorization of remote assistance for an autonomous vehicle is described herein. A constraint that inhibits propulsion by a mechanical system of the autonomous vehicle is activated by a computing system of the autonomous vehicle, wherein a signal that identifies the activated constraint is transmitted from the autonomous vehicle to a remote computing system. The remote computing system generates instructions to deactivate the activated constraint. A return signal is transmitted from the remote computing system that specifies instructions to deactivate the constraint and a distance to desirably advance the autonomous vehicle. The computing system of the autonomous vehicle deactivates the constraint and the mechanical system is controlled to advance the autonomous vehicle when signal latency is less than a predetermined threshold duration of time.

20 Claims, 9 Drawing Sheets

MICRO-AUTHORIZATION OF REMOTE ASSISTANCE FOR AN AUTONOMOUS VEHICLE

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

In certain instances, erroneous sensor system outputs and/or control algorithms can cause the propulsion system to cease forward advancement of the autonomous vehicle based upon detection of a phantom object by the internal computing system. A phantom object is an object represented in a sensor signal that, while predicted by the internal computing system to occupy the same space as the autonomous vehicle if propulsion is maintained, is either not actually going to result in harm to the autonomous vehicle or does not actually occupy such space (e.g., false positive detection of an object). Examples of phantom objects include, but are not limited to, steam rising out of a sewer vent, which can be passed through by the autonomous vehicle, and reflections of solid objects captured by the sensor system, such as a reflection of a traffic cone from a puddle or other reflective surface that causes the autonomous vehicle to erroneously cease forward advancement.

Flawed sensor system outputs provided to the internal computing system and/or execution of undesirable control algorithms can result in an undesirable experience for passengers of the autonomous vehicle, particularly when erroneous outputs such as detection of a phantom object causes the autonomous vehicle to assume a stopped position at an unexpected location. Further, autonomous vehicle control systems are oftentimes configured to execute default instructions that maintain the mechanical systems in an inactive state until an affirmative sensor signal is received by the internal computing system that indicates propulsion can safely resume. In situations, such as detection of phantom objects, where it is likely that an affirmative sensor signal will not be received by the internal computing system for an extended period of time, a highly practical way to advance the autonomous vehicle beyond its current location may be through manual controls by a passenger of the autonomous vehicle. However, manual control of the autonomous vehicle by a passenger thereof is contrary to a primary purpose of the autonomous vehicle, which is to navigate to an intended destination without being controlled by a driver.

SUMMARY

The following is a brief summary of subject matter that is described in greater detail herein. This summary is not intended to be limiting as to the scope of the claims.

Described herein are various technologies pertaining to micro-authorization of remote assistance for an autonomous vehicle. With more specificity, described herein is a computing system that generates instructions to incrementally advance the autonomous vehicle. With still more specificity, described herein is a remote computing system that receives a signal from an autonomous vehicle, wherein the signal identifies an activated constraint that inhibits advancement of the autonomous vehicle. A constraint is a restriction upon an operation of the autonomous vehicle. The remote computing system generates instructions to deactivate the activated constraint, wherein deactivation of the constraint can cause the autonomous vehicle to desirably advance a predefined distance (e.g., 1 meter) with each set of instructions generated to deactivate the constraint. A return signal is transmitted to the autonomous vehicle to initiate an increment of advancement by the autonomous vehicle, wherein the return signal includes the instructions to deactivate the activated constraint and the distance to desirably advance the autonomous vehicle.

The signal transmitted to the remote computing system by the autonomous vehicle identifies the constraint (e.g., a rule that prohibits the autonomous vehicle from performing an operation such as forward or reverse propulsion), wherein initiation of the constraint inhibits propulsion by a mechanical system of the autonomous vehicle. The return signal received by the autonomous vehicle from the remote computing system specifies instructions to deactivate the constraint and can identify a desirable distance for propulsion (e.g., the return signal can specify the desired distance for propulsion or the desired distance for propulsion can be predefined). According to an example, the constraint can be deactivated by the autonomous vehicle and a mechanical system can be controlled based upon the desirable distance for propulsion when signal latency is less than a predetermined threshold duration of time, wherein the signal latency is measured by a time interval defined by transmission of the signal from the autonomous vehicle to receipt of the return signal by the autonomous vehicle.

In an example, at least one of a sensor system of an autonomous vehicle or an object trajectory algorithm implemented by the autonomous vehicle can cause the autonomous vehicle to generate an output that causes an activated constraint to inhibit advancement of the autonomous vehicle. In particular, propulsion by the mechanical system is ceased by the internal computing system and the autonomous vehicle assumes a stopped position at which human intervention may be required through remote assistance to control the autonomous vehicle. The autonomous vehicle includes an internal computing system comprising a memory and processor configured to execute instructions for transmitting a signal (e.g., a timestamped signal) that identifies to a remote computing system an output that has prohibited forward advancement of the autonomous vehicle.

An operator of the remote computing system, such as a remote assistance expert, may be prompted by a signal that identifies an activated constraint currently inhibiting advancement of the autonomous vehicle. The remote assistance expert can identify, from a plurality of options, one or more controls that facilitate desirable operations of the autonomous vehicle. For example, the remote assistance expert can initiate a micro-authorization of remote assistance, which thereby establishes a desirable distance for propulsion (e.g., less than or equal to 1.5 meters) by temporarily deactivating the constraint and allowing the autonomous vehicle to advance the desirable distance to a newly established stop point immediately ahead of the autonomous vehicle. The increment at which the autonomous vehicle is instructed to advance may be based upon video data transmitted to the remote computing system that corresponds to a field of view from a location of the autonomous vehicle.

The distance to desirably advance the autonomous vehicle can be deployed to the autonomous vehicle from the remote computing system and activated as an additional constraint upon navigational controls.

If the constraint is reactivated after execution of instructions provided by a first return signal from the remote computing system to advance the autonomous vehicle a first desirable distance for propulsion, a second return signal can be transmitted from the remote computing system to the autonomous vehicle based upon a second increment of advancement to initiate a second desirable distance for propulsion by the mechanical system. The distance to desirably advance the autonomous vehicle is oftentimes executed through a remote assistance user interface by selecting an available control (e.g., a button) displayed by the remote computing system. However, in exemplary embodiments, the return signal can also include data that specifies at least one of steering controls or propulsion controls received through a remote assistance user interface device, such as a remote steering wheel and/or a remote gas pedal operated by the remote assistance expert.

The remote computing system is configured to identify a timestamp included in the signal received from the autonomous vehicle, wherein the timestamp corresponds to a time that the signal was transmitted to the remote computing. When the remote computing system generates instructions in response to the incoming signal, the timestamp included as part of the incoming signal can be incorporated in the return signal transmitted back to the autonomous vehicle. The internal computing system of the autonomous vehicle can determine signal latency by comparing the timestamp to a time that the return signal is received by the autonomous vehicle. In an exemplary embodiment, the increment of advancement is only executed by the autonomous vehicle when latency of the roundtrip signal is within a predetermined threshold (e.g., a half second). The predetermined threshold provides a failsafe to network degradation and/or transmission delays to ensure that stale instructions from the remote computing system are not executed by the autonomous vehicle. In an example, stale instruction may be caused by a delay in initiation of micro-authorization by the remote assistance expert to advance the autonomous vehicle. Additionally, if a return signal is not received by the autonomous vehicle from the remote computing system, for example due to inaction by the remote assistance expert, advancement of the autonomous vehicle remains inhibited by the activated constraint.

While deactivating the constraint is oftentimes a temporary measure to advance the autonomous vehicle through an identified area on an as-needed basis, the instructions to deactivate the constraint can also be maintained by the autonomous vehicle for an identified area to preclude the constraint from subsequently inhibiting advancement of the autonomous vehicle through the identified area. That is, if the internal computing system of the autonomous vehicle detects a same object, such as steam from a sewer vent, that has already been micro-authorized by a remote assistance expert, the instructions to deactivate the constraint can be configured to preclude the same object from triggering the constraint again at the identified area.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
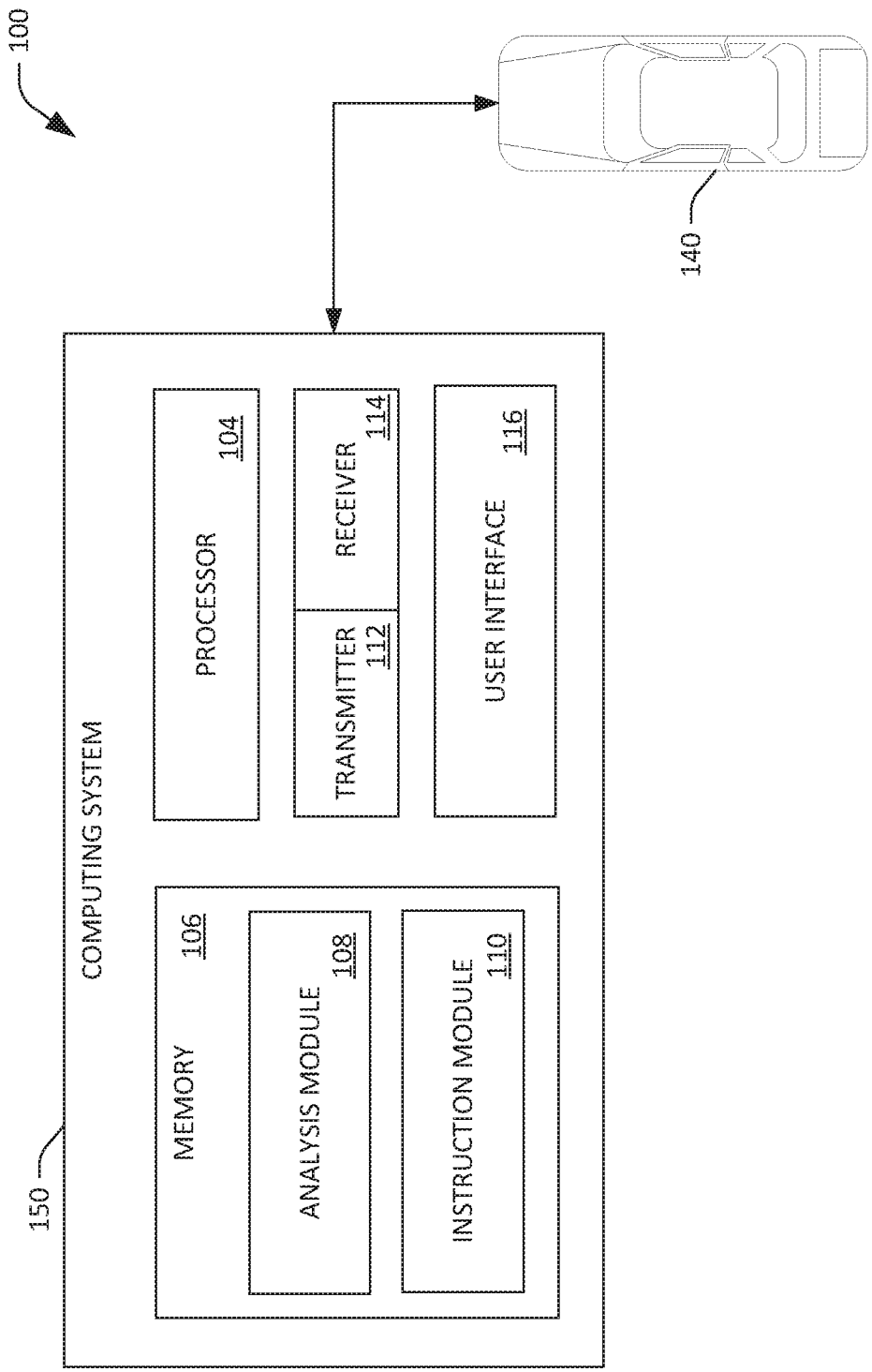
FIG. 1 illustrates an exemplary environment including a computing system in communication with an autonomous vehicle.

Various technologies pertaining to micro-authorization of remote assistance for an autonomous vehicle is now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B.

In addition, the articles "a" and "an" as used in this application and the appended claims should generally be construed to mean "one or more" unless specified otherwise or clear from the context to be directed to a singular form.

Further, as used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component, module, or system may be localized on a single device or distributed across several devices.

Further, as used herein, the term "exemplary" is intended to mean serving as an illustration or example of something and is not intended to indicate a preference.

With reference now to FIG. 1, an exemplary environment 100 is illustrated that includes a computing system 150 in communication with an autonomous vehicle 140. The computing system 150 is configured to receive a signal from the autonomous vehicle 140 that identifies a constraint activated by the autonomous vehicle 140, wherein the constraint inhibits propulsion (i.e., actuation of a vehicle propulsion system of the autonomous vehicle 140 is ceased by the constraint). In other embodiments, the computing system 150 can additionally or alternatively interrogate the autonomous vehicle 140 to determine what, if any, constraints have been activated by the autonomous vehicle 140. The computing system 150 includes a transmitter 112 and a receiver 114, which may be configured as a single transceiver, to establish communication with the autonomous vehicles 140. For instance, the receiver 114 can receive a video or other signal from the autonomous vehicle 140 and the transmitter 112 can transmit a return signal to advance the autonomous vehicle 140 based upon the video or other signal received from the autonomous vehicle 140.

The computing system 150 comprises a processor 104 and memory 106 that stores instructions that, when executed by the processor 104, cause the processor 104 to perform acts in accordance therewith. Memory 102 includes an analysis module 108 and an instruction module 110, which cooperate to provide a return signal to the autonomous vehicle 140 to initiate execution of an incremental advancement. The analysis module 108 can be configured to identify candidate instances where a constraint may have been unnecessarily activated by the autonomous vehicle 140 to maintain safe navigation. For example, the analysis module 108 may identify a high probability that a phantom object, such as steam from a sewer vent, has been detected by the autonomous vehicle 140 based upon the autonomous vehicle remaining stopped at a specific location for at least a threshold period of time. When the analysis module 108 determines that human intervention may be desirable to facilitate advancement of the autonomous vehicle 140, the computing system 150 can cause information (e.g., video data from the autonomous vehicle 140) to be displayed to a remote assistance expert to solicit user input regarding the candidate instance. Additionally or alternatively, the analysis module 108 can receive the signal from the autonomous vehicle 140, and responsive to receipt of the signal, can cause information to be displayed (e.g., via a user interface 116) to solicit user input to remotely control the autonomous vehicle 140.

The computing system 150 includes a user interface 116 that presents data received from the autonomous vehicle 140, such as the video data, descriptions of the constraint, etc., wherein a remote assistance expert can provide micro-authorizations of remote assistance based upon the data. The micro-authorizations may cause an instruction or series of repetitive instructions to be generated that advance the autonomous vehicle 140 by a given increment (e.g., 1 meter) with each micro-authorization received through the user interface 116. The instructions to deactivate the activated constraint are generated by the instruction module 110 when the micro-authorization is received through the user interface 116. The instruction module 110 further identifies the distance to desirably advance the autonomous vehicle 140. The distance to desirably advance the autonomous vehicle can be defined by the instruction module 110 or input by the remote assistance expert through the user interface 116.

Figure 2:
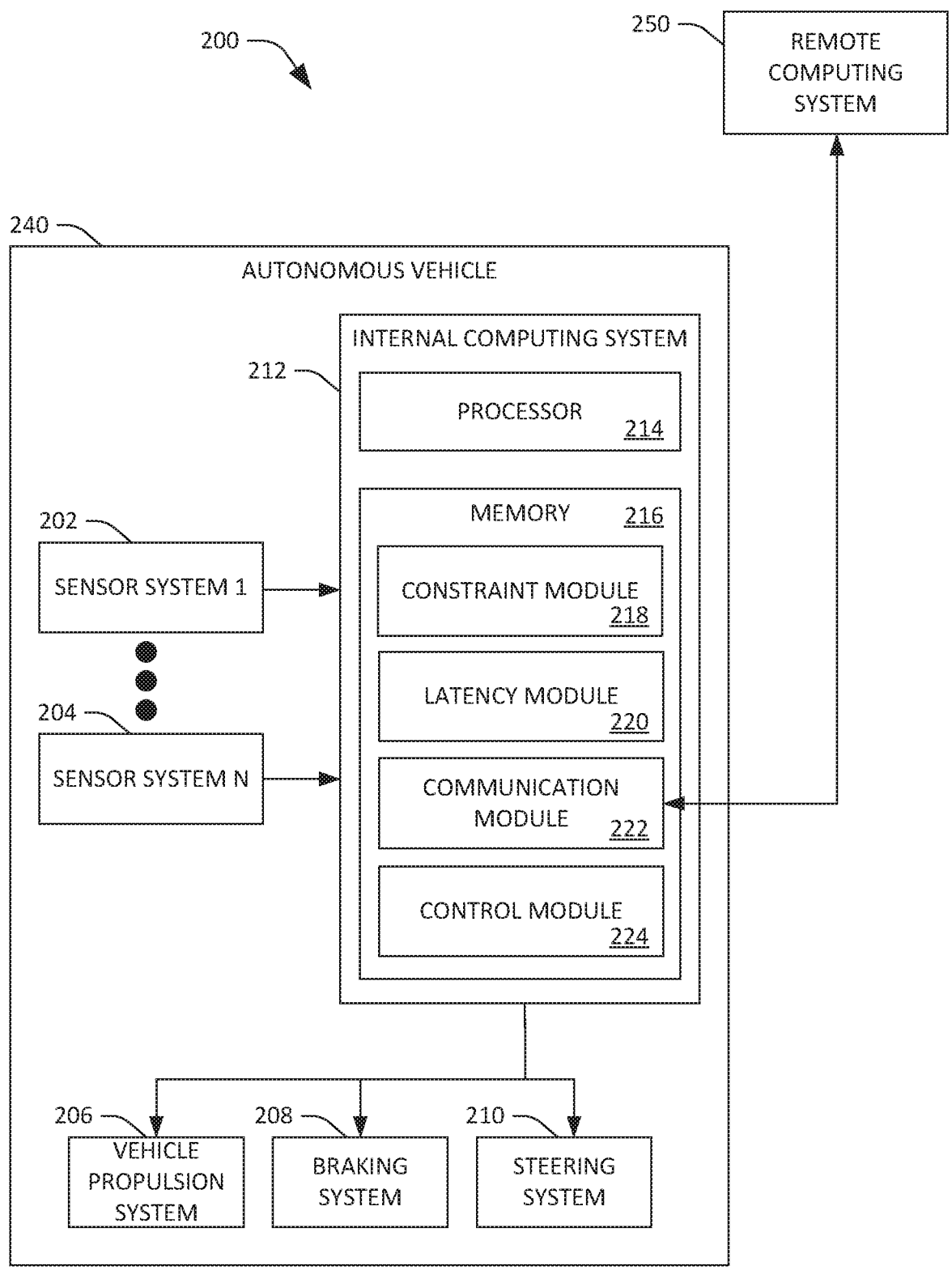
FIG. 2 illustrates an exemplary environment including an autonomous vehicle in communication with a remote computing system.

With reference now to FIG. 2, an exemplary environment 200 is illustrated that includes an autonomous vehicle 240 in communication with a remote computing system 250. The remote computing system 250 and the autonomous vehicle 240 may be the computing system 150 and the autonomous vehicle 140, respectively. The autonomous vehicle 240 can navigate about roadways without a human driver based upon sensor signals output by sensor systems 202-204 of the autonomous vehicle 240. The autonomous vehicle 240 includes a plurality of sensor systems 202-204 (a first sensor system 202 through an Nth sensor system 204). The sensor systems 202-204 are of different types and are arranged about the autonomous vehicle 240. For example, the first sensor system 202 may be a camera sensor system and the Nth sensor system 204 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 240 further includes several mechanical systems that are used to effectuate appropriate motion of the autonomous vehicle 240. For instance, the mechanical systems can include but are not limited to, a vehicle propulsion system 206, a braking system 208, and a steering system 210. The vehicle propulsion system 206 may include an electric motor, an internal combustion engine, or both. The braking system 208 can include an engine break, brake pads, actuators, and/or any other suitable componentry that is configured to assist in decelerating the autonomous vehicle 240. The steering system 210 includes suitable componentry that is configured to control the direction of movement of the autonomous vehicle 200 during navigation.

The autonomous vehicle 240 additionally comprises an internal computing system 212 that is in communication with the sensor systems 202-204 and the mechanical systems 206-210. The internal computing system 212 includes a processor 214 and memory 216 having computer-executable instructions that are executed by the processor 214. A constraint module 218 and a latency module 220 are incorporated in memory 216 to facilitate safe propulsion of the autonomous vehicle 240. The constraint module 218 includes instructions for activating a constraint based on a rule-based restriction upon an operation of the autonomous vehicle 240. For example, the constraint may be a restriction upon navigation that is activated in accordance with protocols configured to avoid occupying the same space as other objects, abide by traffic laws, circumvent avoidance areas, etc. An avoidance area, for instance, can be a geographic area through which an autonomous vehicle is prohibited from being routed. The autonomous vehicle 240 remaining stopped at a location for at least a threshold period of time may be indicative of a constraint that has been activated by the autonomous vehicle 240 based on detection of a nearby object.

In instances where a constraint has been improperly activated by the constraint module 218 (e.g., detection of a phantom object) and the constraint module 218 receives a signal from the remote computing system 250 to deactivate the constraint, the latency module 220 ensures that a stale signal has not been received from the remote computing system 250 before authorizing deactivation of the constraint. The latency module 220 includes instructions to incorporate a timestamp as part of outgoing signals to the remote computing system 250. If the timestamp is returned to the autonomous vehicle 240 in less than a predetermined threshold duration of time, the latency module 220 outputs a signal to the constraint module 218 that authorizes deactivation of the constraint.

Memory 216 further comprises a communication module 222 and a control module 224. The control module 224 is configured to control operation of the vehicle propulsion system 206, the braking system 208, and/or the steering system 210. The control module 224 receives sensor signals from the sensor systems 202-204 as well as outputs from modules incorporated in memory 216. The communication module 222 may be configured as an independent module of memory 216 or included in the autonomous vehicle 240 as a separate system that transmits and receives signals from/to the remote computing system 250. The communication module 222 is configured to transmit information wirelessly over a network, for example, through an antenna array that provides personal long-term evolution (LTE) communication.

Figure 3:
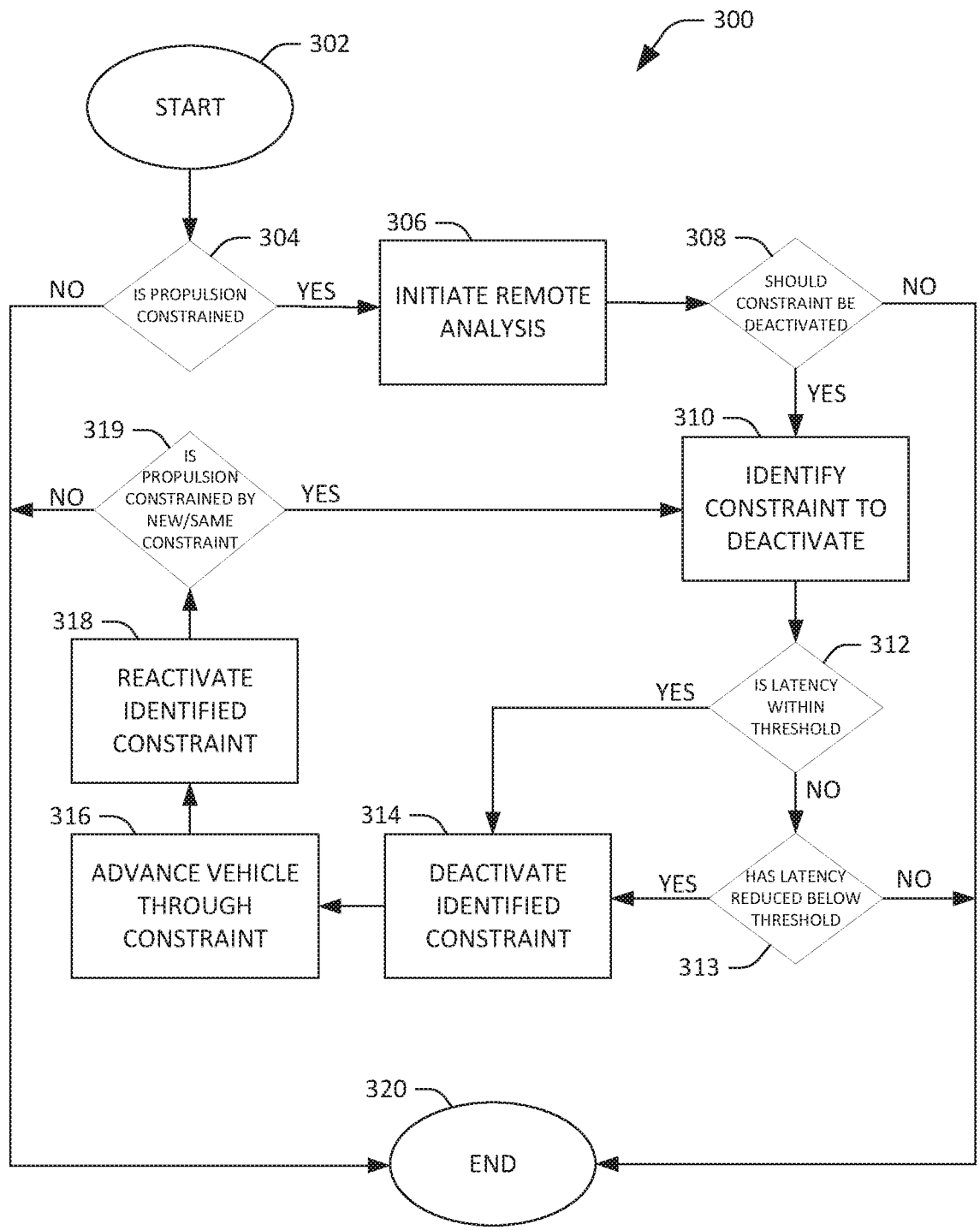
FIG. 3 illustrates an exemplary flow diagram for micro-authorization of remote assistance for an autonomous vehicle.

With reference now to FIG. 3, an exemplary flow diagram 300 for micro-authorization of remote assistance for an autonomous vehicle is illustrated. The flow diagram 300 starts at 302, and at 304 a determination is made (e.g., by an internal computing system) that identifies whether propulsion of the autonomous vehicle is constrained. If propulsion is not constrained at 304, the flow diagram 300 completes at 320. Otherwise, remote analysis of the constraint is initiated at 306. At 308, a second determination is made (e.g., by a remote computing system) that identifies whether the constraint should be deactivated. For instance, a constraint can be temporarily deactivated when the autonomous vehicle can continue to navigate safely without adhering to the constraint. If the constraint should not be deactivated, such as when the constraint is desirable to maintain safe operation of the autonomous vehicle, the flow diagram 300 completes at 320. Otherwise, the constraint is identified at 310 for deactivation.

Identification of the constraint to deactivate at 310 may be performed by a remote computing system and returned to the autonomous vehicle where, at 312, a determination is made (e.g., by the internal computing system) that identifies whether signal latency is within a predefined threshold. If so, the identified constraint is deactivated at 314 to allow the autonomous vehicle to advance through the constraint at 316. If signal latency is not within the predefined threshold, for instance due to network degradation or transmission delays from the remote computing system, an operator of the remote computing system is notified that signal latency exceeds the predefined threshold and that instructions from the remote computing system cannot be executed by the autonomous vehicle unless signal latency is reduced below the predefined threshold. For example, rather than terminating a session immediately if latency is too high, the operator of the remote computing system is notified that their commands will be rejected due to high latency and that the operator can wait for latency to reduce. If, at 313, signal latency is determined to have reduced below the predefined threshold, the identified constraint is deactivated at 314 to allow the autonomous vehicle to advance through the constraint at 316. Otherwise, the flow diagram 300 completes at 320.

Once the autonomous vehicle has advanced through the constraint at 316, the identified constraint is reactivated at 318. At 319, it is determined whether propulsion of the autonomous vehicle is constrained by new or same constraint, for example, based upon reactivation of the constraint at 318. If propulsion is not constrained by a new or same constraint at 319, the flow diagram 300 completes at 320. Otherwise, steps 310-319 are repeated until the flow diagram 300 comes to a completion at 320.

Figure 4:
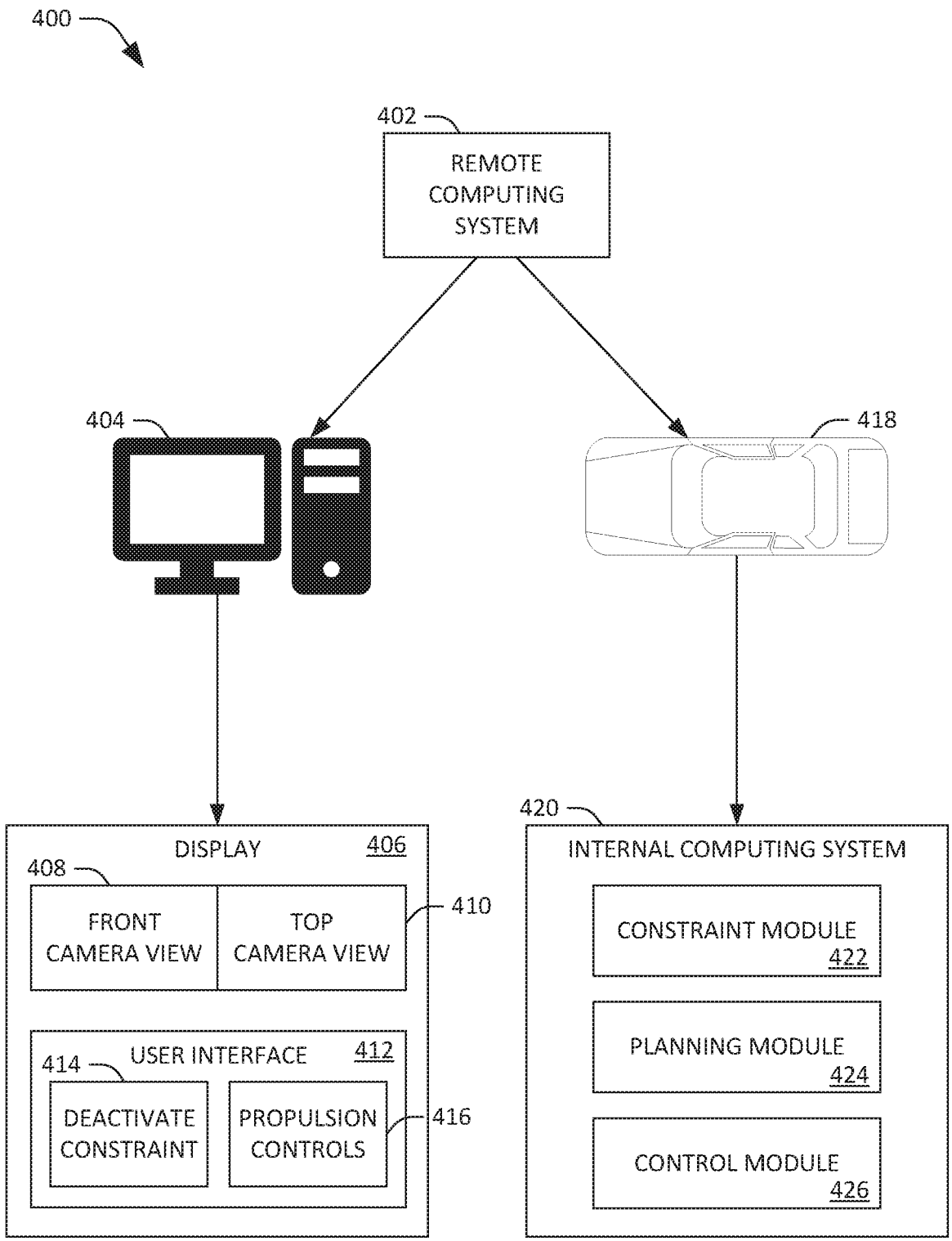
FIG. 4 illustrates an exemplary remote computing system configured to communicate with a remote workstation and an autonomous vehicle.

With reference now to FIG. 4, environment 400 illustrates a remote computing system 402 in communication with a remote workstation 404 and an autonomous vehicle 418. The remote workstation 404 may be a computing device such as a desktop computer, laptop computer, tablet, mobile device, etc. that is operated by a remote assistance expert to send and receive signals to/from the remote computing system 402 and further to/from the autonomous vehicle 418. The remote work station 404 includes a display 406 which is configured to display a front camera view 408, a top camera view 410, amongst others, based upon video signals received from the autonomous vehicle 418. Video feeds displayed at the camera views 408-410 facilitate remote assistance through the user interface 412 by displaying a field of view at the location of the autonomous vehicle 418. The user interface 412 can receive an input to control the autonomous vehicle 418. For example, a deactivate constraint 414 and/or propulsion controls 416 input can be initiated by the remote assistance expert through the user interface 412.

The autonomous vehicle 418 includes an internal computing system 420 having a constraint module 422, a planning module 424, and a control module 426. The constraint module 422 and the control module 426 may be or include the constraint module 218 and the control module 226 of the autonomous vehicle 240. The planning module 424 includes executable instructions configured to identify a plurality of potential routes and maneuvers by the autonomous vehicle 418.

Figure 5:
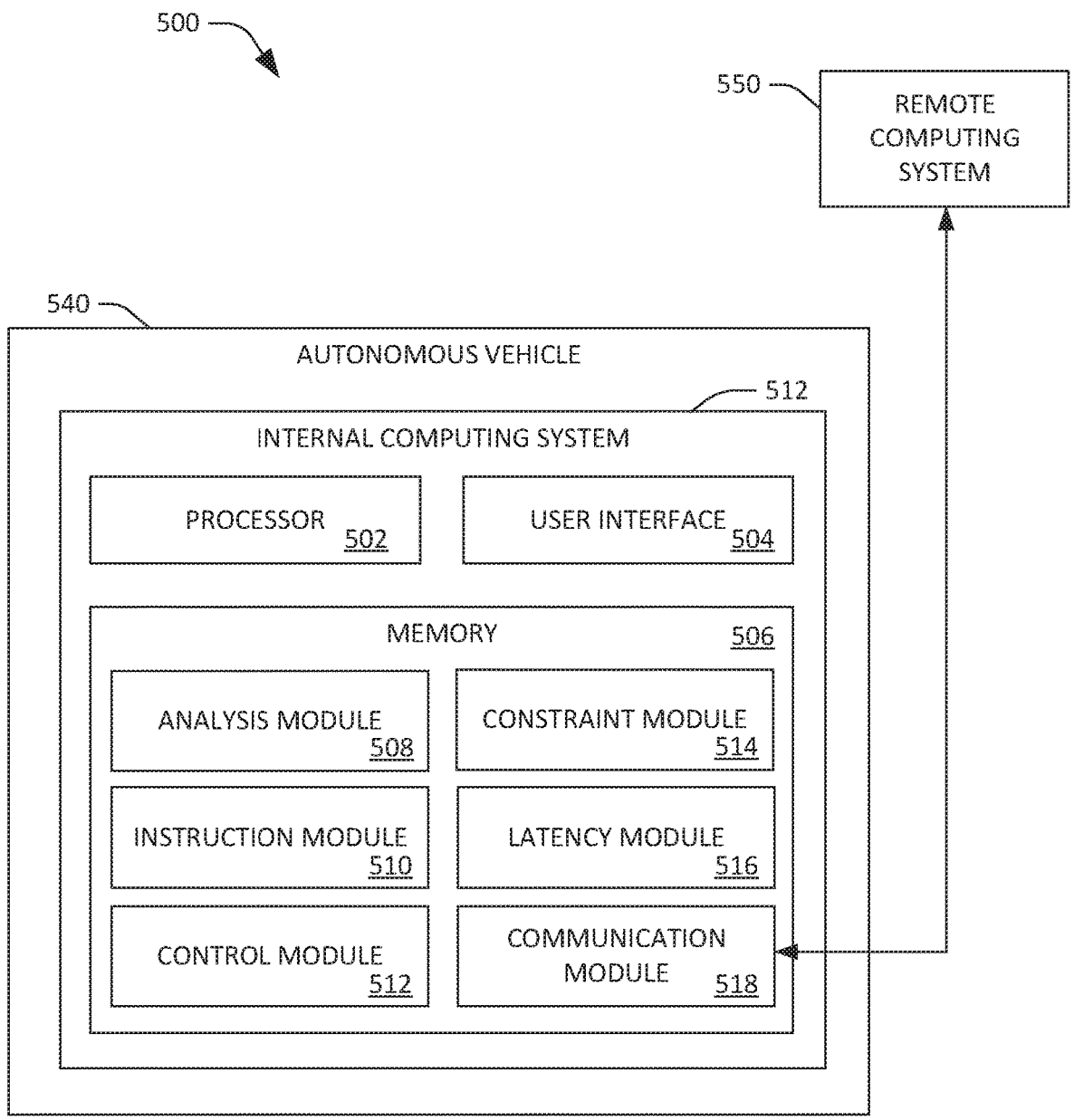
FIG. 5 illustrates an exemplary environment including an autonomous vehicle configured to receive a micro-authorization through local assistance.

With reference now to FIG. 5, an exemplary environment 500 is illustrated comprising an autonomous vehicle 540 configured to communicate with a remote computing system 550. The autonomous vehicle 540 includes an internal computing system 512 having a user interface 504 and a memory 506 that includes an analysis module 508 and an instruction module 510, similar to that of the computing system 150, wherein the analysis module 508 and the instruction module 510 are executed by the processor 502. The internal computing system 512 may facilitate local assistance of a constrained autonomous vehicle by a passenger thereof. For instance, an activated constraint may be desirably deactivated by a passenger of the autonomous vehicle 540 when the autonomous vehicle 540 is unable to communicate with the remote computing system 550 and/or when the remote computing system 550 is non-responsive to signals transmitted from the internal computing system 512. The control module 512, the constraint module 514, the latency module 516, and the communication module 518 incorporated in the memory 506 can likewise be executed by the processor 502 to provide similar functionality to the systems and modules included in the autonomous vehicle 240.

Figure 6:
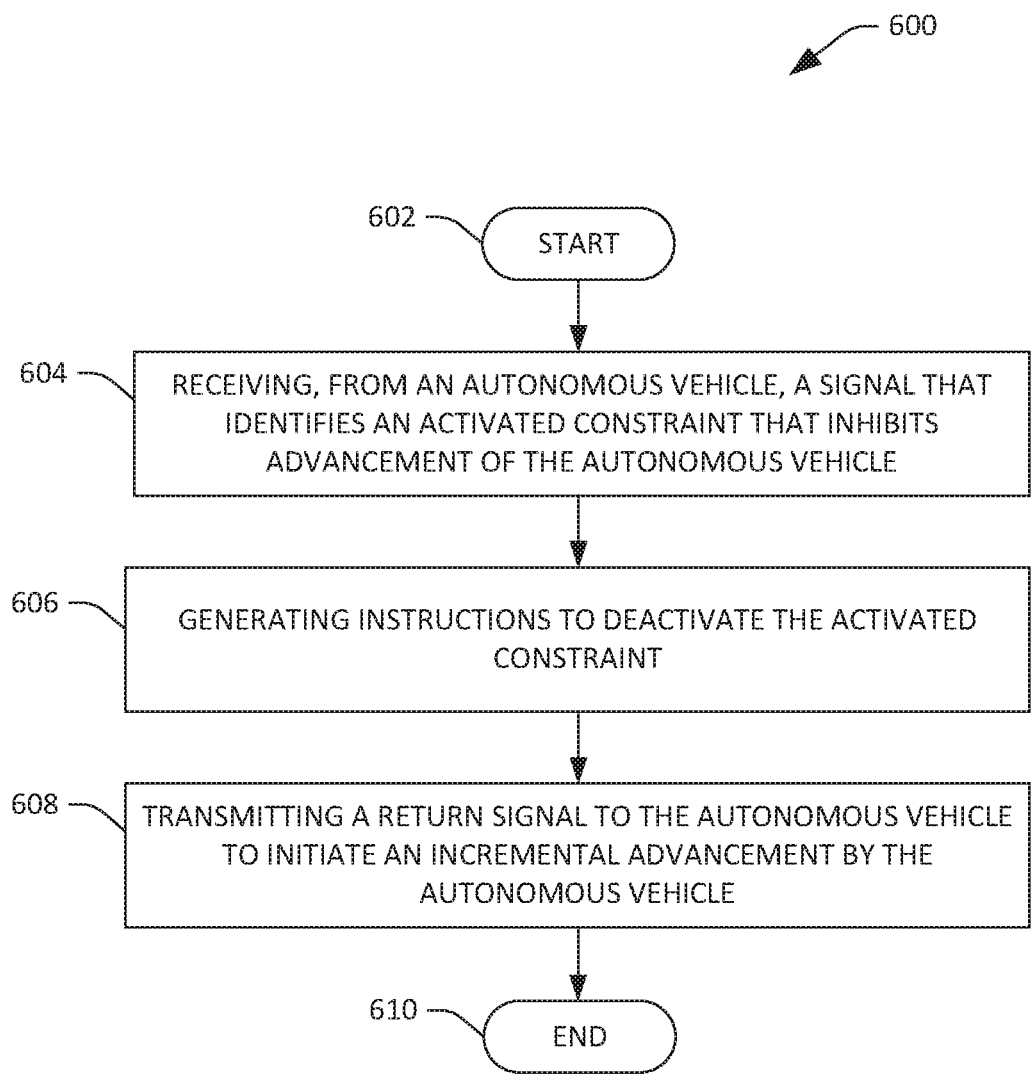
FIG. 6 is a flow diagram illustrating an exemplary methodology for providing a micro-authorization by remote assistance.
Figure 7:
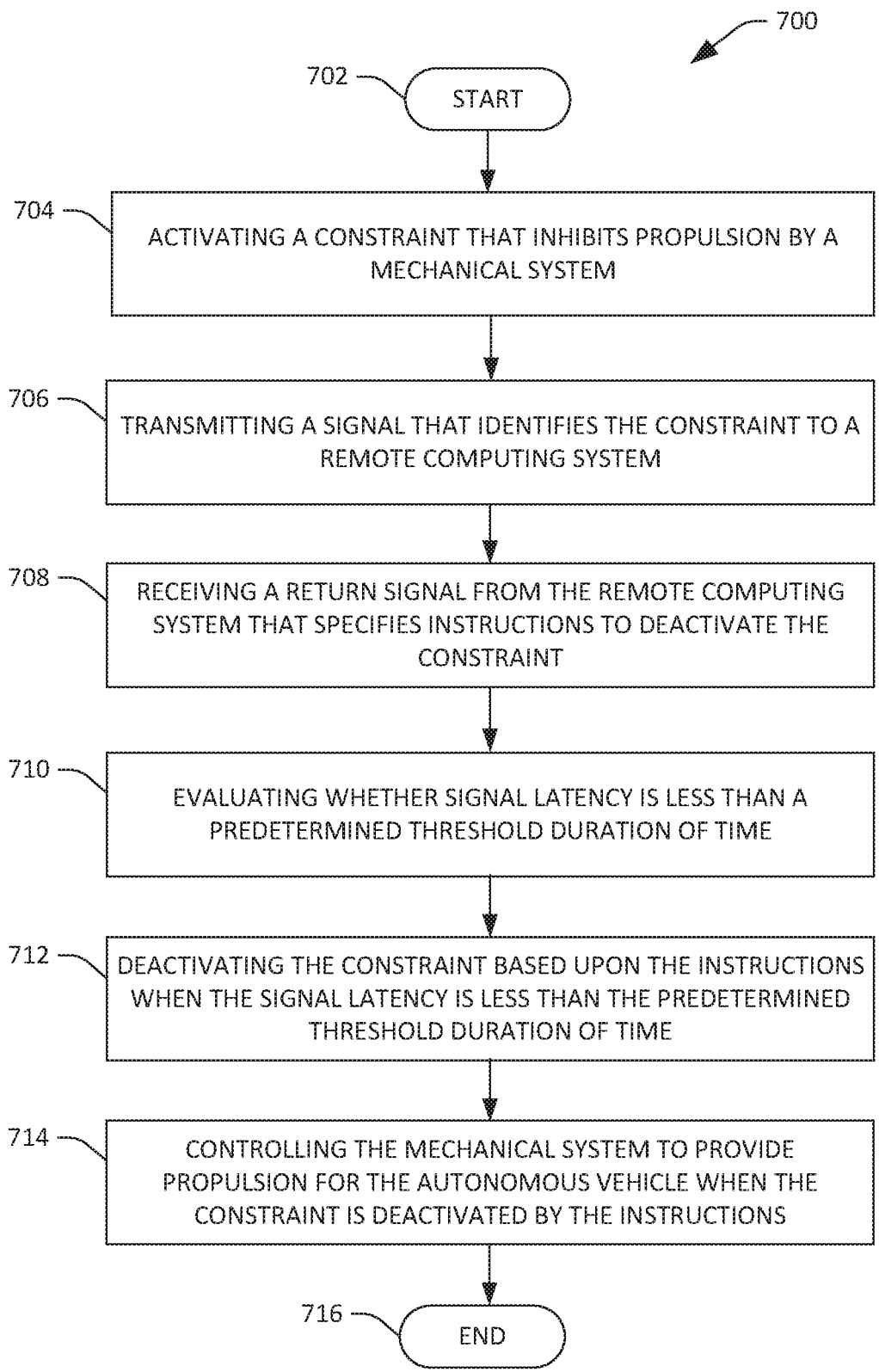
FIG. 7 is a flow diagram illustrating an exemplary methodology for executing a micro-authorization by an autonomous vehicle.
Figure 8:
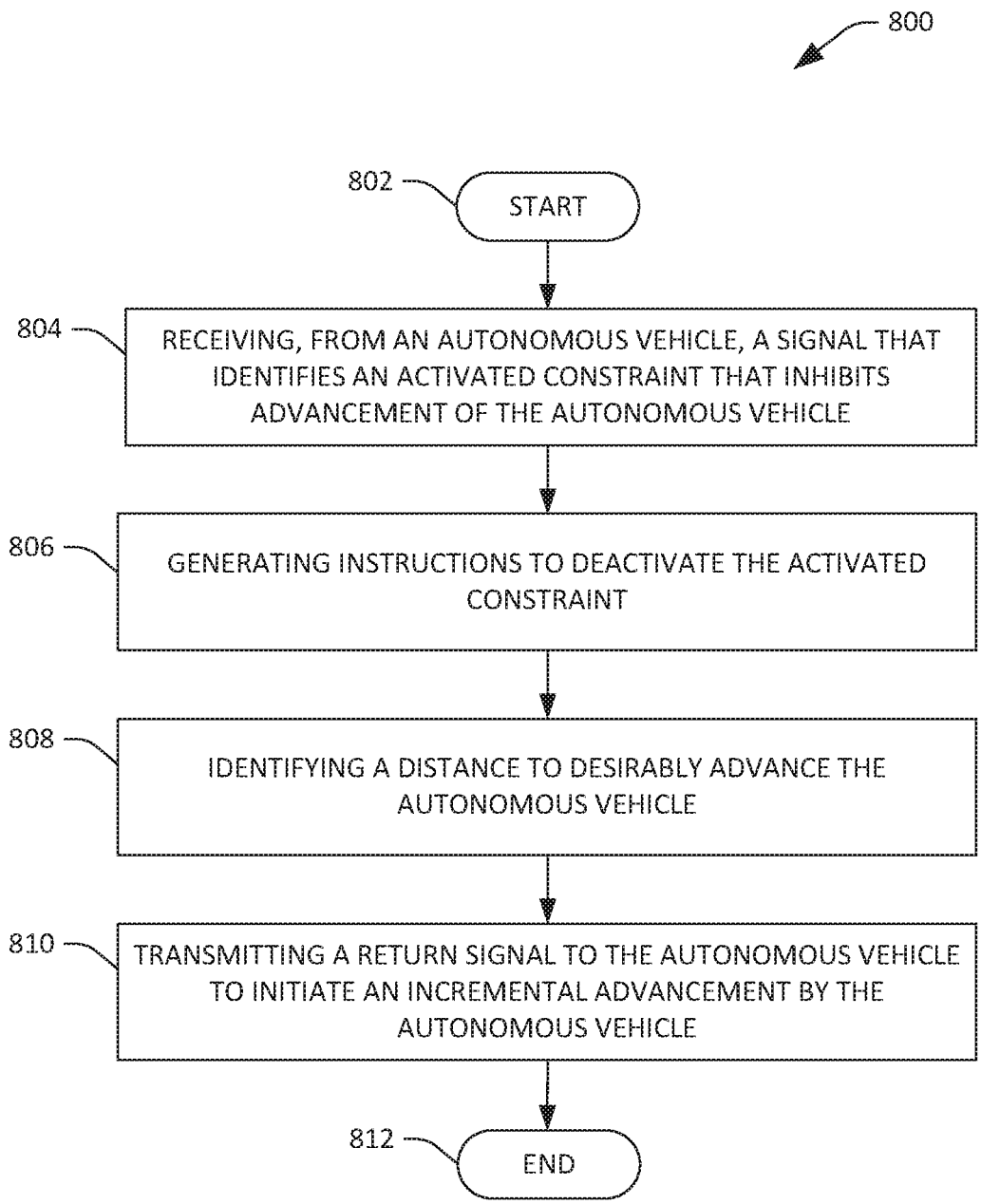
FIG. 8 is a flow diagram illustrating an exemplary methodology for providing a micro-authorization by remote assistance.

FIGS. 6-8 illustrate exemplary methodologies for micro-authorization of remote assistance for an autonomous vehicle. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 6, an exemplary methodology 600 for micro-authorization of remote assistance for an autonomous vehicle is illustrated. The methodology 600 starts at 602, and at 604 a signal that identifies an activated constraint is received from an autonomous vehicle, wherein the activated constraint inhibits advancement by the autonomous vehicle. A constraint of an autonomous vehicle is a rule-based restriction upon an operation of the autonomous vehicle (e.g., abiding by traffic laws, precluding navigation through avoidance areas, prohibiting the autonomous vehicle from occupying the same space as other objects, etc.). At 606, instructions are generated to deactivate the activated constraint. The instructions are responsive to user input, such as input from a remote assistance expert at a remote workstation. At 608, a return signal is transmitted to the autonomous vehicle to initiate an increment of advancement by the autonomous vehicle. The return signal includes the instructions to deactivate the activated constraint. The increment of advancement may be a distance of 1.5 meters or less. The methodology 600 completes at 610.

Referring now to FIG. 7, an exemplary methodology 700 for micro-authorization of remote assistance for an autonomous vehicle is illustrated. The methodology 700 starts at 702, and at 704 a constraint is activated that inhibits propulsion by a mechanical system of an autonomous vehicle. A constraint is a rule-based restriction upon an operation of an autonomous vehicle (e.g., abiding by traffic laws, precluding navigation through avoidance areas, prohibiting the autonomous vehicle from occupying the same space as other objects, etc.). At 706, a signal that identifies the constraint is transmitted to a remote computing system. The remote computing system processes information provided by the signal to generate instructions for the autonomous vehicle. At 708, a return signal is received from the remote computing system. The return signal specifies instructions to deactivate the constraint. At 710, signal latency is evaluated to determine whether signal latency is less than a predetermined threshold duration of time (e.g., a half second or less). The signal latency is measured by a time interval defined by transmission of the signal from the autonomous vehicle to receipt of the return signal by the autonomous vehicle. At 712, the constraint is deactivated based upon the instructions to deactivate the constraint when signal latency is less than the predetermined threshold. At 714, the mechanical system is controlled to provide propulsion for the autonomous vehicle when the constraint is deactivated by the instructions to deactivate the constraint. The methodology 700 completes at 716.

Referring now to FIG. 8, an exemplary methodology 800 for micro-authorization of remote assistance for an autonomous vehicle is illustrated. The methodology 800 starts at 802, and at 804 a signal that identifies an activated constraint is received from an autonomous vehicle, wherein the activated constraint inhibits advancement by the autonomous vehicle. A constraint of an autonomous vehicle is a rule-based restriction upon an operation of the autonomous vehicle (e.g., abiding by traffic laws, precluding navigation through avoidance areas, prohibiting collisions with other objects, etc.). At 806, instructions are generated to deactivate the activated constraint. At 808, a distance is identified to desirably advance the autonomous vehicle. The distance to desirably advance the autonomous vehicle may be identified based upon a predefined distance value or selected by a remote assistance expert on an individual basis. For instance, removal of the constraint may facilitate advancement of the autonomous vehicle in increments of 1.5 meters or less. At 810, a return signal is transmitted to the autonomous vehicle to initiate an increment of advancement by the autonomous vehicle. The return signal includes the instructions to deactivate the activated constraint and the distance to desirably advance the autonomous vehicle. The methodology 800 completes at 812.

Figure 9:
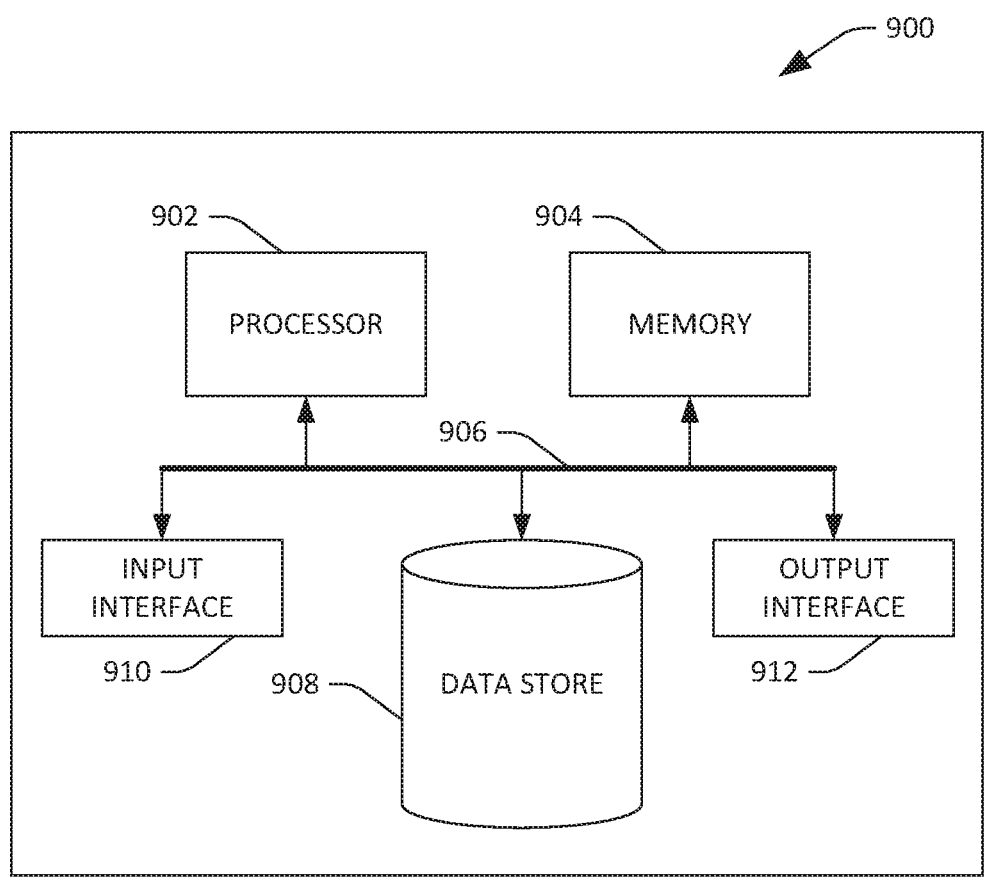
FIG. 9 illustrates an exemplary computing system.

Referring now to FIG. 9, a high-level illustration of an exemplary computing device 900 that can be used in accordance with the systems and methodologies disclosed herein is illustrated. For instance, the computing device 900 may be or include the computing systems (150, 250). The computing device 900 includes at least one processor 902 that executes instructions that are stored in a memory 904. The instructions may be, for instance, instructions for implementing functionality described as being carried out by one or more modules and systems discussed above or instructions for implementing one or more of the methods described above. In addition to storing executable instructions, the memory 904 may also store location information, distance information, direction information, etc.

The computing device 900 additionally includes a data store 908 that is accessible by the processor 902 by way of the system bus 906. The data store 908 may include executable instructions, location information, distance information, direction information, etc. The computing device 900 also includes an input interface 910 that allows external devices to communicate with the computing device 900. For instance, the input interface 910 may be used to receive instructions from an external computer device, etc. The computing device 900 also includes an output interface 912 that interfaces the computing device 900 with one or more external devices. For example, the computing device 900 may transmit control signals to the vehicle propulsion system 206, the braking system 208, and/or the steering system 210 by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An autonomous vehicle, comprising:
    a mechanical system; and
    a computing system in communication with the mechanical system, wherein the computing system comprises:
        a processor; and
        memory that stores computer-executable instructions that, when executed by the processor, cause the processor to perform acts comprising:
            activating a constraint that controls the mechanical system to stop movement of the autonomous vehicle, wherein the constraint is a restriction upon an operation of the autonomous vehicle such that the autonomous vehicle is stopped at a first stopped position, and wherein the constraint is activated to stop the movement of the autonomous vehicle based on an object detected in a travel path of the autonomous vehicle;
            transmitting a signal that identifies the constraint to a remote computing system;
            receiving a return signal from the remote computing system, wherein the return signal specifies instructions to deactivate the constraint when the object is a phantom object;
            evaluating whether signal latency is less than a predetermined threshold duration of time, wherein the signal latency is measured by a time interval defined by the transmission of the signal to the receipt of the return signal;
            deactivating the constraint based upon the instructions to deactivate the constraint when the signal latency is less than the predetermined threshold duration of time; and
            controlling the mechanical system to move the autonomous vehicle when the constraint is deactivated by the instructions to deactivate the constraint, wherein the mechanical system is controlled to move the autonomous vehicle to a second stopped position that is a particular distance from the first stopped position when the constraint is deactivated by the instructions to deactivate the constraint.

2. The autonomous vehicle of claim 1, the acts performed by the processor further comprising:
    when the autonomous vehicle is stopped at the second stopped position, transmitting a second signal that identifies the constraint to the remote computing system;
    receiving a second return signal from the remote computing system, wherein the second return signal specifies second instructions to deactivate the constraint;
    deactivating the constraint based upon the second instructions to deactivate the constraint when a second signal latency is less than the predetermined threshold duration of time, wherein the second signal latency is a time interval defined by the transmission of the second signal to the receipt of the second return signal; and
    controlling the mechanical system to move the autonomous vehicle when the constraint is deactivated by the second instructions to deactivate the constraint, wherein the mechanical system is controlled to move the autonomous vehicle to a third stopped position that is a second particular distance from the second stopped position when the constraint is deactivated by the second instructions to deactivate the constraint.

3. The autonomous vehicle of claim 1, the acts performed by the processor further comprising:
    identifying the particular distance that the autonomous vehicle is to be moved, the particular distance being specified as part of the return signal; and
    controlling the mechanical system based upon the particular distance when the constraint is deactivated by the instructions to deactivate the constraint.

4. The autonomous vehicle of claim 1, wherein the particular distance is less than or equal to 1.5 meters.

5. The autonomous vehicle of claim 1, the acts performed by the processor further comprising:
    transmitting video data captured by the autonomous vehicle to the remote computing system, wherein the return signal received from the remote computing system is based upon the video data.

6. The autonomous vehicle of claim 1, the acts performed by the processor further comprising:
    detecting the object in the travel path of the autonomous vehicle based on at least one of a sensor system output or an object trajectory algorithm.

7. The autonomous vehicle of claim 1, wherein the autonomous vehicle remains stopped at the first stopped position when the return signal is not received from the remote computing system.

8. The autonomous vehicle of claim 1, wherein the return signal further includes data that specifies at least one of steering controls or propulsion controls; and
    wherein the mechanical system is controlled based upon the at least one of the steering controls or the propulsion controls.

9. The autonomous vehicle of claim 1, wherein the particular distance is a predefined distance.

10. The autonomous vehicle of claim 1, wherein the autonomous vehicle remains stopped at the first stopped position when the signal latency is greater than or equal to the predetermined threshold duration of time.

11. The autonomous vehicle of claim 1, wherein the return signal is sent by the remote computing system responsive to user input received by the remote computing system.

12. A method of controlling an autonomous vehicle, comprising:
   detecting an object in a travel path of the autonomous vehicle;
   activating a constraint that controls a mechanical system to stop movement of the autonomous vehicle based on the object detected in the travel path of the autonomous vehicle, wherein the constraint causes the autonomous vehicle to stop at a first stopped position;
   transmitting a signal that identifies the constraint to a remote computing system;
   receiving a return signal from the remote computing system, wherein the return signal specifies instructions to deactivate the constraint when the object is a phantom object;
   evaluating whether signal latency is less than a predetermined threshold duration of time, wherein the signal latency is measured by a time interval defined by the transmission of the signal to the receipt of the return signal;
   deactivating the constraint based upon the instructions to deactivate the constraint when the signal latency is less than the predetermined threshold duration of time; and
   controlling the mechanical system to move the autonomous vehicle when the constraint is deactivated by the instructions to deactivate the constraint, wherein the mechanical system is controlled to move the autonomous vehicle to a second stopped position that is a particular distance from the first stopped position when the constraint is deactivated by the instructions to deactivate the constraint.

13. The method of claim 12, further comprising:
   when the autonomous vehicle is stopped at the second stopped position, transmitting a second signal that identifies the constraint to the remote computing system;
   receiving a second return signal from the remote computing system, wherein the second return signal specifies second instructions to deactivate the constraint;
   deactivating the constraint based upon the second instructions to deactivate the constraint when a second signal latency is less than the predetermined threshold duration of time, wherein the second signal latency is a time interval defined by the transmission of the second signal to the receipt of the second return signal; and
   controlling the mechanical system to move the autonomous vehicle when the constraint is deactivated by the second instructions to deactivate the constraint, wherein the mechanical system is controlled to move the autonomous vehicle to a third stopped position that is a second particular distance from the second stopped position when the constraint is deactivated by the second instructions to deactivate the constraint.

14. The method of claim 12, wherein the particular distance is less than or equal to 1.5 meters.

15. The method of claim 12, wherein the particular distance is a predefined distance.

16. The method of claim 12, wherein the particular distance is specified as part of the return signal.

17. A computing system of an autonomous vehicle, comprising:
   a processor; and
   memory that stores computer-executable instructions that, when executed by the processor, cause the processor to perform acts comprising:
      detecting an object in a travel path of the autonomous vehicle;
      causing the autonomous vehicle to stop at a first stopped position based on the object detected in the travel path;
      receiving a signal from a remote computing system to incrementally advance the autonomous vehicle, the signal being received when the object is a phantom object; and
      causing the autonomous vehicle to move in response to the receipt of the signal, wherein the autonomous vehicle is controlled to move to a second stopped position that is a particular distance from the first stopped position.

18. The computing system of claim 17, wherein the particular distance is less than or equal to 1.5 meters.

19. The computing system of claim 17, wherein the particular distance is a predefined distance.

20. The computing system of claim 17, wherein the particular distance is specified as part of the signal received from the remote computing system.

* * * * *